(12) United States Patent
Snyder

(10) Patent No.: US 6,513,454 B1
(45) Date of Patent: Feb. 4, 2003

(54) MARTIN HOUSE STARLING EXCLUDER

(76) Inventor: John S. Snyder, 129 Youkers Rd., Butler, PA (US) 16001

( * ) Notice: Subject to any disclaimer, the term of this patent is extended or adjusted under 35 U.S.C. 154(b) by 0 days.

(21) Appl. No.: 10/007,956

(22) Filed: Nov. 13, 2001

(51) Int. Cl.[7] .............................................. A01K 31/00
(52) U.S. Cl. ...................... 119/428; 119/329; 119/469; 119/478; 119/481; 119/494
(58) Field of Search ................. 119/428, 429, 119/52.3, 52.4, 57.9, 329–469, 478, 481, 494; D30/110, 111, 113

(56) References Cited

U.S. PATENT DOCUMENTS

| | | | |
|---|---|---|---|
| 1,166,100 A | | 12/1915 | White |
| 1,248,220 A | * | 11/1917 | Wayne .......................... 119/478 |
| 1,491,210 A | * | 4/1924 | Steinback ................... 119/52.4 |
| 2,230,058 A | * | 1/1941 | Hornung ..................... 119/52.3 |
| 2,827,876 A | * | 3/1958 | Trobaugh |
| 3,783,831 A | * | 1/1974 | Patliff .......................... 119/435 |
| 4,033,296 A | * | 7/1977 | Cudmore ..................... 119/428 |
| 4,471,721 A | | 9/1984 | Vail |
| 5,134,970 A | * | 8/1992 | Oh .............................. 119/428 |
| 5,172,651 A | | 12/1992 | Finn |
| 5,228,410 A | | 7/1993 | Parker |
| D423,148 S | * | 4/2000 | Prekup ....................... D30/110 |

OTHER PUBLICATIONS

Reprint of "Charles E. McEwen: 1992 PMCA Landlord of the Year" from Purple Martin UPdate vol. 13(4), Jun. 1992 in U.S.A.

Lance D. Wood "Convertin Martin Houses and Gourds to Starling–resistant Entrances" believed published in Purple Martin Update in U.S.A. in 1999 or 2000.

* cited by examiner

Primary Examiner—Yvonne Abbott
(74) Attorney, Agent, or Firm—Gaca, Matis, Baum & Rizza

(57) ABSTRACT

A birdhouse entrance is provided with an entrance opening having two posts projecting vertically from the bottom edge of the opening toward the top edge. The two posts are spaced apart such that a bird of selected size cannot pass between them without opening its wings. Sufficient clearance for the wings is provided between the outer edges of the posts and the side edges of the entrance opening.

20 Claims, 5 Drawing Sheets

MARTIN HOUSE STARLING EXCLUDER

BACKGROUND OF THE INVENTION

This invention relates to protective devices for birdhouses, and, more particularly, to an entrance which prevents undesirable birds from entering a purple martin house.

Purple martins are beneficial birds and many people maintain birdhouses to attract them. Purple martin houses are generally constructed from metal, plastic or wood. Purple martin houses made from hollow gourds and molded plastic artificial "gourds" are also common. Traditionally, all of these types of purple martin houses have had circular entrance openings.

It has long been recognized that predatory birds, such as starlings, owls and hawks, will enter purple martin houses and either kill or evict the purple martins. European starlings, which were introduced into America during the nineteenth century, present a particularly serious threat to purple martins. Various devices, such as those described in U.S. Pat. Nos. 5,228,410 and 1,166,100, have been used to make the entrance opening of birdhouses smaller in order to prevent entry by larger undesirable birds. While such devices will exclude larger predators, such as owls and hawks, from purple martin houses, they will not exclude starlings, which are substantially the same size as purple martins. Starlings are notorious for attempting to take over martin nests by killing or injuring the martins, and by despoiling the nests. Also, nesting starlings will chase off investigating martins, ruining the chance of establishing a colony site. Traps, such as those described in U.S. Pat. Nos. 5,172,651 and 4,471,4721, may discourage starlings, but will not positively exclude them from purple martin houses.

It has recently been found that purple martins will readily use an entrance opening that is in the shape of an oval or a circle segment, but that starlings are somewhat reluctant to enter such openings. Use of such an opening would reduce the likelihood that a starling will enter a purple martin house, but does not completely eliminate this possibility.

SUMMARY OF THE INVENTION

This invention provides an entrance for a purple martin house having an opening with two posts projecting vertically from the bottom edge toward the top edge. The spacing between the posts is such that a bird of the size of an adult purple martin and starling cannot pass between them without opening its wings. Sufficient space is provided between the outer edges of the posts and the side edges of the entrance opening to provide clearance for the wings of a bird as it passes between the posts. It has been found that purple martins will readily use such openings, but that starlings will not do so. Starlings will thus be excluded from a birdhouse having such an entrance opening. Because the opening is too small for them, larger predators, such as owls and hawks, will also be excluded.

The spacing between the outer edges of the posts and the side edges of the entrance opening is also made wide enough that a purple martin chick can reach through it for feeding. The entrance opening will thus allow at least three young birds to present themselves for feeding by a parent at the same time.

DETAILED DESCRIPTION OF THE INVENTION

Figure 1:
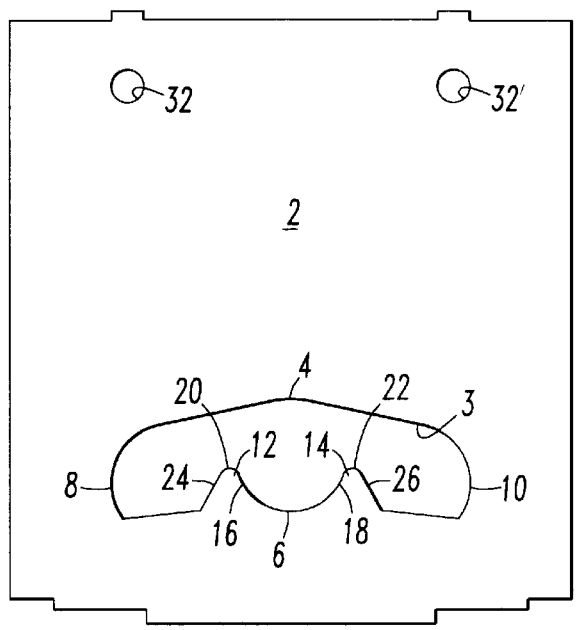
FIG. 1 is a front elevation view of an excluder plate having an entrance opening in accordance with the invention.
Figure 2:
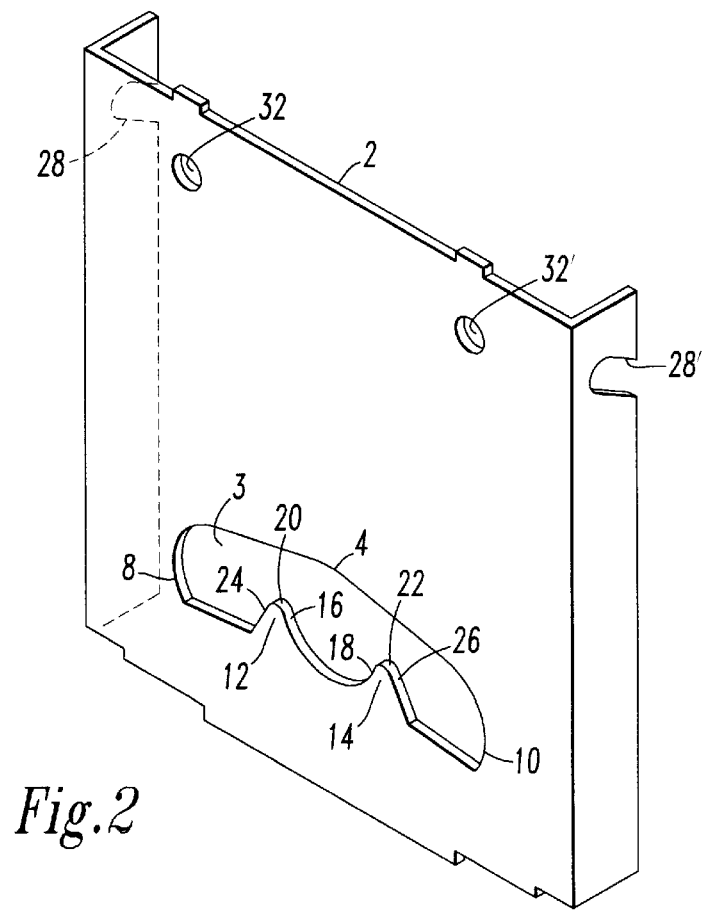
FIG. 2 is a prespective view of the excluder plate shown in FIG. 1.

FIGS. 1 and 2 show an excluder plate 2 made of a sheet of metal having an entrance opening 3 defined by top edge 4, bottom edge 6, and a first side edge 8 and a second side edge 10. A first post 12 and a second post 14 each project vertically from the bottom edge 6 toward the tope edge 4. The inner side 16 of the first post 12 and the inner side 18 are spaced apart such that a bird of the size of an adult purple martin and starling cannot pass between them without opening its wings. The posts 12 and 14 have tips 20 and 22 respectively which are spaced away from the top edge 4 sufficiently to allow the wings of a bird of the size of an adult purple martin to pass between the tips 20 and 22 of the posts and the top edge 4. However, the tips 20 and 22 of the posts are close enough to the top edge 4 that the bird cannot pass through the opening 3 without passing between the posts 12 and 14. The posts 12 and 14 have outer sides 24 and 26 respectively which are sufficiently spaced away from side edges 8 and 10 to provide clearance for the wings of a bird passing between the two posts. However the side edge 8 is close enough to the outer side 24 of post 12 that a bird of the selected size cannot pass between them and the side edge 10 is similarly close to the outer size 26 of post 14 that a bird of that size cannot pass between them.

Figure 3:
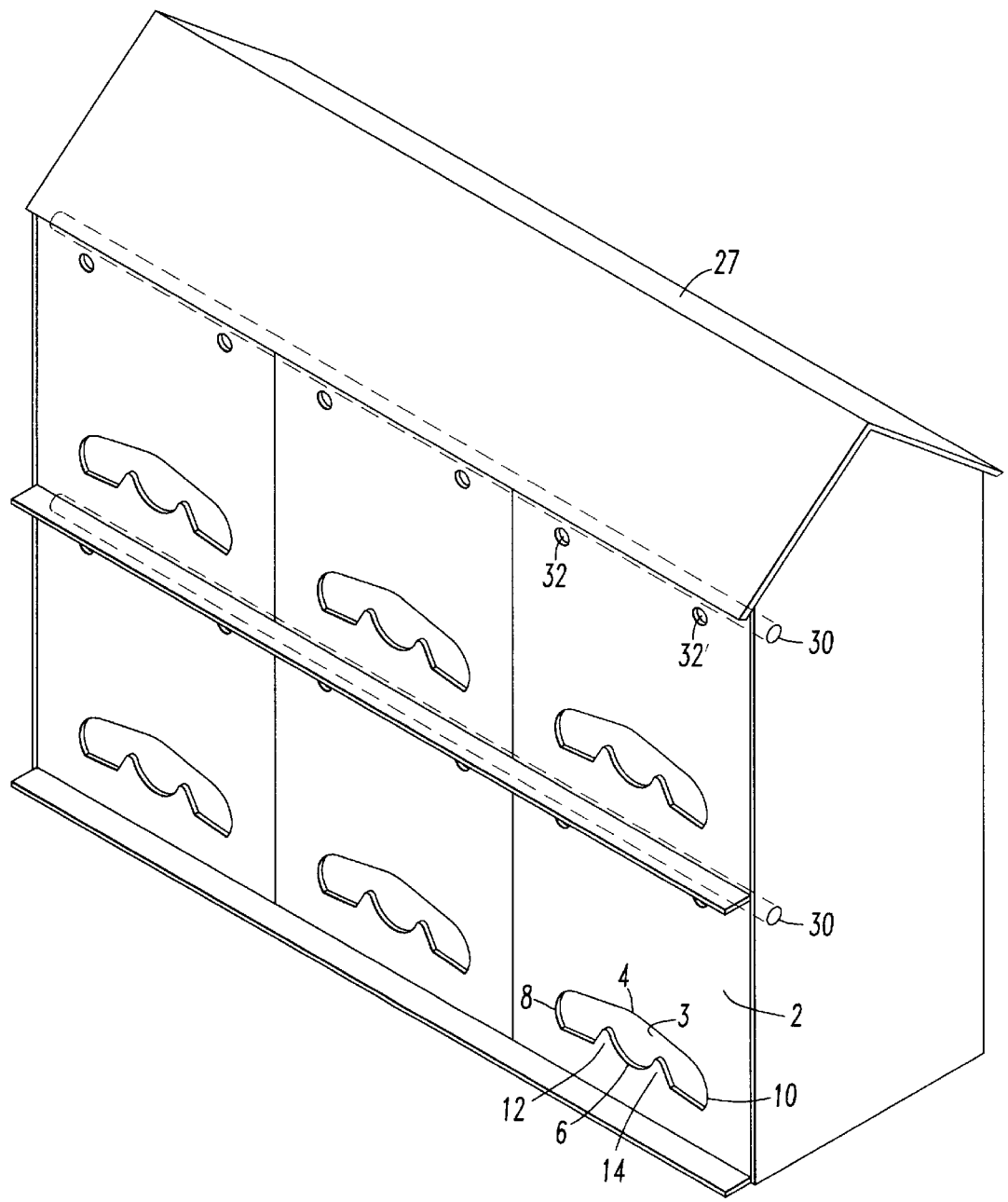
FIG. 3 is a prespective view of a birdhouse provided with the excluder plate shown in FIG. 1 and FIG. 2.

The excluder plate shown in FIGS. 1 and 2 is adapted to form the front wall of a conventional sheet metal martin house, such as the house 27 depicted in FIG. 3. The excluder plate 1 is provided with slots 28 and 28' so that the plate can be removably mounted on one of the support rods 30 with which such houses are provided. The excluder plate 1 is also provided with ventilation holes 32 and 32'.

I have found that purple martins will readily use a birdhouse equipped with an excluder plate having an opening 3 as described above, while starlings, although of similar size, will not enter it. This appears to be because a starling will not enter an opening that requires it to allow an object such as the posts 12 or 14 to pass between its body and one of its wings. Purple martins, on the other hand, are not troubled by this. Larger undesirable birds, such as owls and hawks, will be excluded simply because the opening 3 is too small for them.

I have found that the excluder described above will function best if the vertical distance from the center of the lower edge 6 to the center of the top edge 4 is substantially 3.073 cm (1.210 inches). If this distance is less than about 2.87 cm (1.135 inches), purple martins will be unwilling to pass through it, while, if it is greater than about 4.44 cm (1.75 inches), starlings will not be excluded. The tips 20 and 22 of the posts are rounded to prevent injury to the wings or body of a purple martin and the horizontal distance between the tips is 3.57 cm (1.41 inches) plus or minus 0.32 cm (0.13 inches). The vertical distance from either of the tips to the top edge 10 should be no more than 1.85 cm (0.73 inches) and is best made approximately 1.59 cm (0.63 inches).

I have found it desirable to make the total width of the entrance opening 3, from side edge 8 to side edge 10, 9.68 cm (3.81 inches) plus or minus 0.63 cm. (0.25 inches). This provides ample clearance for the wings of a purple martin passing between the posts 12 and 14, while not providing sufficient space to allow a starling to pass between a post and an outer edge. This width has the added advantage of providing sufficient space between each post and the adjacent outer edge that a purple martin chick can reach through it for feeding. This allows three young birds to present themselves for feeding by a parent at the same time, one in the space between the side edge 8 and post 12, one between the two posts, and one between post 14 and side edge 10.

Figure 4:
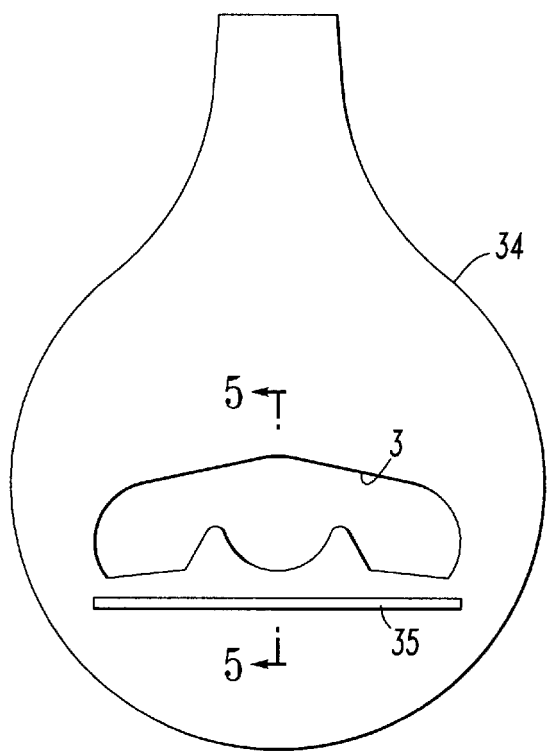
FIG. 4 is a front elevation view of a second embodiment of the invention.
Figure 5:
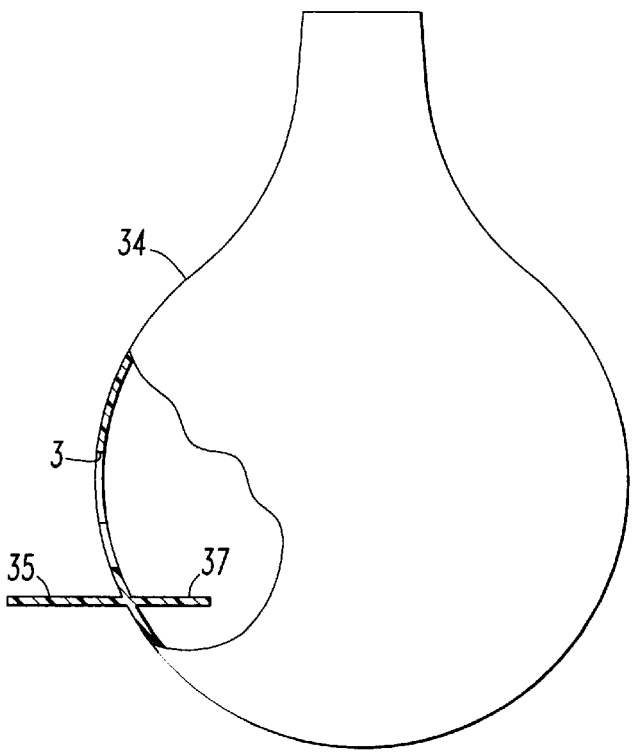
FIG. 5 is a side elevation view of the embodiment shown in FIG. 4 partially sectioned along line 5—5 of FIG. 4.

A second embodiment of my invention is shown in FIGS. 4 and 5. In this embodiment the entrance opening 3 of an otherwise conventional molded plastic "gourd" purple martin house 34 has the shape and dimensions described above. An exterior shelf 35 and an interior shelf 37 are also provided to assist purple martins in utilizing the opening 34 for ingress and egress and for feeding young as described above. The shelves 35 and 37 are each located approximately 1.27 cm. (0.5 inches) below the opening 34 and each should project from the "gourd" 34 at least approximately 7.62 cm (3 inches).

Figure 6:
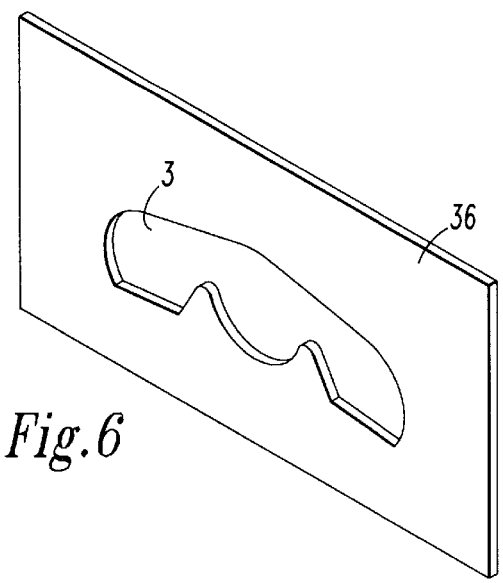
FIG. 6 is a prespective view of an adapter constituting a third embodiment of the invention.
Figure 7:
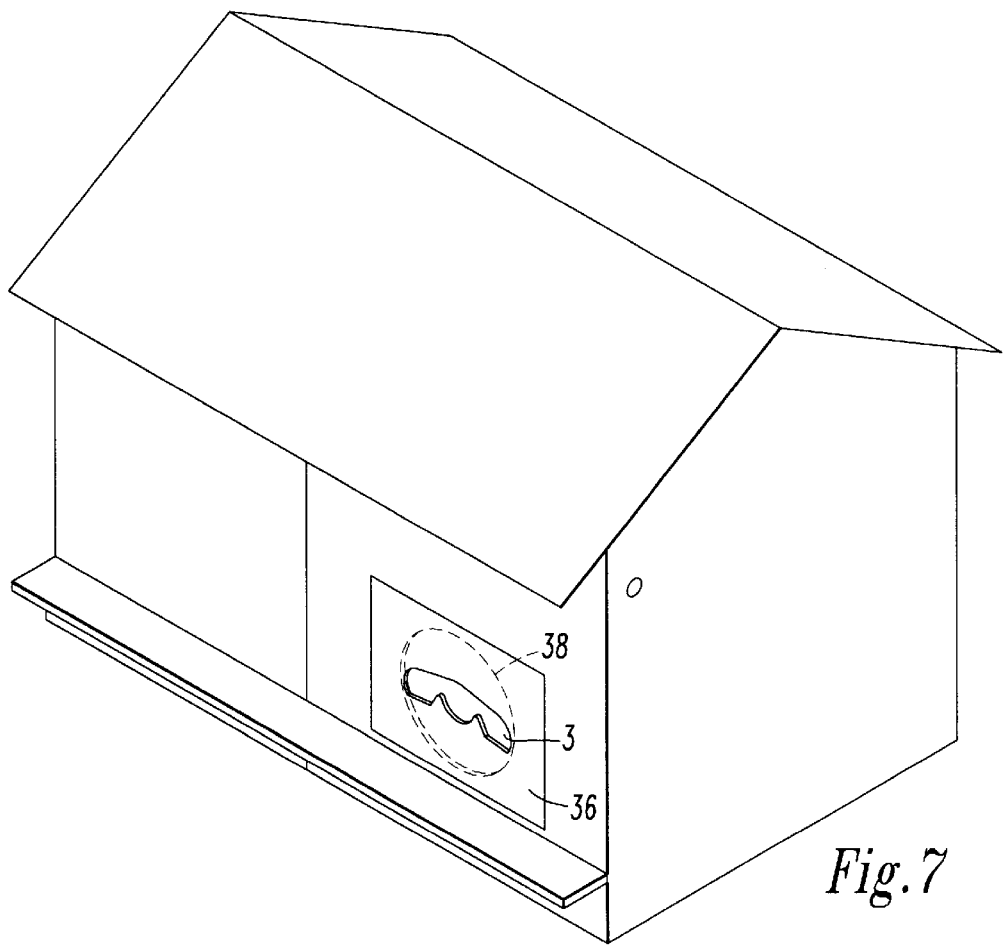
FIG. 7 is a prespective view of a birdhouse provided with the adapter shown in FIG. 6.

FIG. 6 illustrates an adapter 36 to exclude starlings from a conventual purple martin house having a circular entrance opening. The adapter 36 is a flat rectangular sheet having an entrance opening 3 of the shape and dimensions described above. As illustrated in FIG. 7 the adapter 36 can be affixed over a circular entrance opening 38 of a conventional purple martin house 40 to exclude starlings from that house. I have found it convenient to make adapters of sheet metal and to affix them to conventual purple martin house by means of rivets. However, such an adapter may also be made of plastic or wood and may be affixed by means of screws, nails or adhesive.

Figure 8:
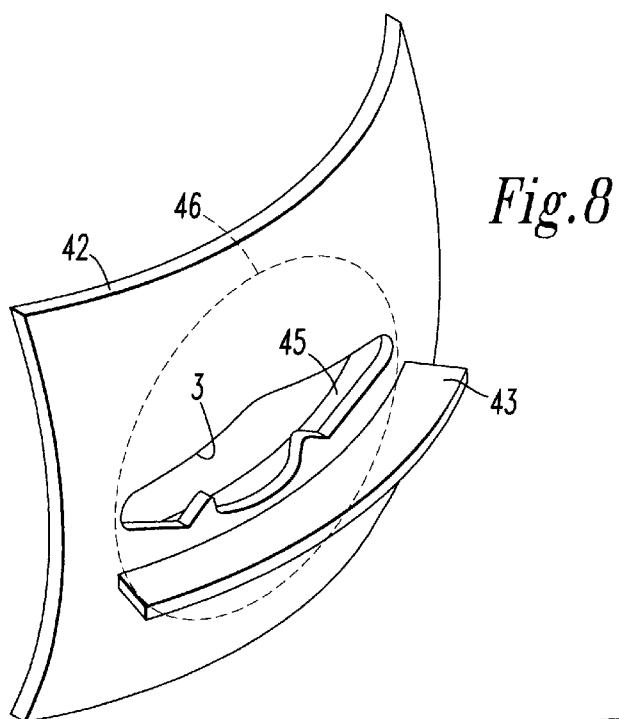
FIG. 8 is a prespective view of yet another type of adapter incorporating the invention.
Figure 9:
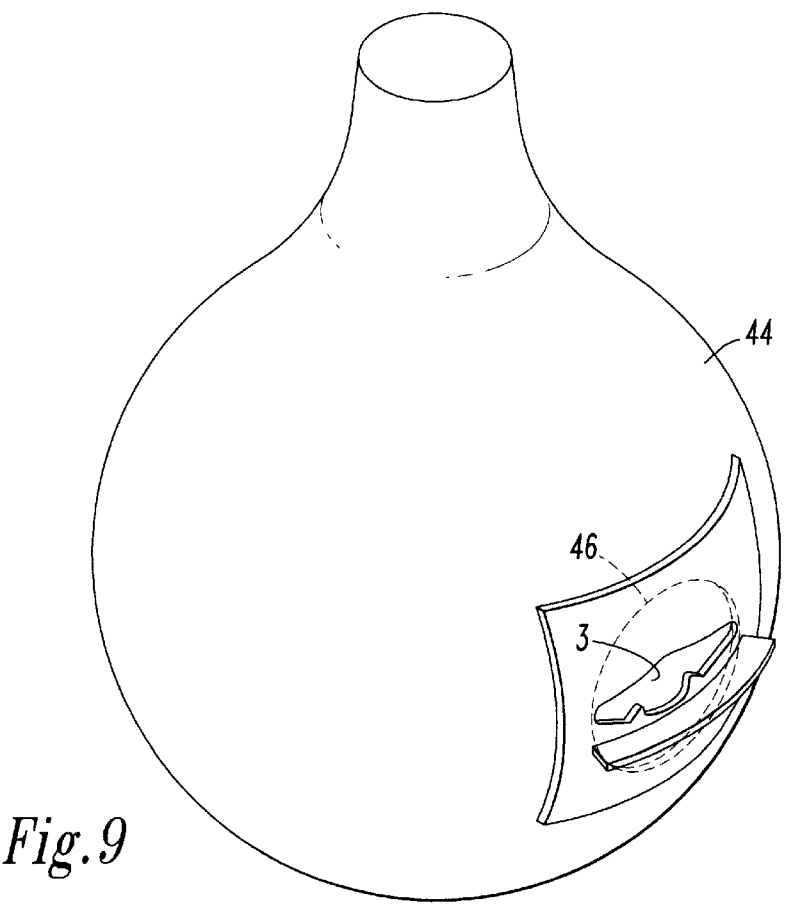
FIG. 9 is a prespective view of a gourd birdhouse with the adapter shown in FIG. 8

FIG. 8 shows another type of adapter which comprises yet another embodiment of my invention. The adapter 42 shown in FIG. 8 has an entrance opening 3 with the shape and dimensions described above and is similar to the adapter 36 shown in FIG. 6, except that the sheet is curved to conform to the curvature of a gourd birdhouse and an exterior shelf 43 and an interior shelf 45 are provided which are similar to the shelves 35 and 37 in the plastic "gourd" purple martin house shown in FIGS. 4 and 5. As shown in FIG. 9, the adapter 42 is used to exclude startings and other undesirable birds from a gourd birdhouse 44 that was originally made with a circular entrance 46.

Many other changes and modifications in the embodiments of the invention can also be carried out without departing from the scope thereof.

I claim:

1. An excluder for use with a birdhouse to prevent the entry of undesired birds, said excluder comprising a sheet provided with an entrance opening, comprising;

a top edge, a bottom edge, a first post projecting vertically from said bottom edge toward said top edge, said first post having a tip spaced away from said top edge, and a second post projecting vertically from said bottom edge toward said top edge, said second post having a tip spaced away from said top edge.

2. An excluder according to claim 1 wherein said first post and said second post are spaced apart such that a bird of the size of a starling cannot pass between them without opening at least one of its wings.

3. An excluder according to claim 2, further comprising;

a first shelf projecting from a first side of said sheet below said entrance opening, and a second shelf projecting from a second side of said sheet below said entrance opening.

4. An excluder according to claim 1 wherein said tip of said first post is spaced away from said tip of said second post by a distance which is at least 3.25 cm (1.28 inches) but not more than 3.89 (1.53 inches).

5. An excluder according to claim 4 wherein;

said tip of said first post is spaced away from said top edge by a distance which is substantially 1.59 cm (0.63 inches), and said tip of said second post is spaced away from said top edge by a distance which is substantially 1.59 cm (0.63 inches).

6. An excluder according to claim 4 wherein said entrance opening further comprises;

a first side edge connecting said top edge and said bottom edge, a second side edge connecting said top edge and said bottom edge, and said first side edge being spaced away from said second edge by a distance of no more than substantially 10.31 cm (4.06 inches).

7. An excluder according to claim 4 wherein said entrance opening further comprises;

a first side edge connecting said top edge and said bottom edge, a second side edge connecting said top edge and said bottom edge, and said first side edge being spaced away from said second edge by a distance of no more than substantially 9.68 cm (3.81 inches).

8. An excluder plate for use as one wall of a birdhouse, said excluder plate being provided with an entrance opening comprising;

a top edge, a bottom edge, a first post projecting vertically from said bottom edge toward said top edge, said first post having a tip spaced away from said top edge, and a second post projecting vertically from said bottom edge toward said top edge, said second post having a tip spaced away from said top edge.

9. An excluder plate according to claim 8 wherein said first post and said second post are spaced apart such that a bird of the size of a starling cannot pass between them without opening at least one of its wings.

10. An excluder plate according to claim 8 wherein said tip of said first post is spaced away from said tip of said second post by a distance which is at least 3.25 cm (1.28 inches) but not more than 3.89 (1.53 inches).

11. An excluder plate according to claim 10 wherein;

said tip of said first post is spaced away from said top edge by a distance which is substantially 1.59 cm (0.63 inches), and said tip of said second post is spaced away from said top edge by a distance which is substantially 1.59 cm (0.63 inches).

12. An excluder plate according to claim 10 wherein said entrance opening further comprises;
   a first side edge connecting said top edge and said bottom edge,
   a second side edge connecting said top edge and said bottom edge, and
   said first side edge being spaced away from said second edge by a distance of no more than substantially 10.31 cm (4.06 inches).

13. An excluder plate according to claim 10 wherein said entrance opening further comprises;
   a first side edge connecting said top edge and said bottom edge,
   a second side edge connecting said top edge and said bottom edge, and
   said first side edge being spaced away from said second edge by a distance of no more than substantially 9.68 cm (3.81 inches).

14. A birdhouse provided with an entrance opening comprising;
   a top edge,
   a bottom edge,
   a first post projecting vertically from said bottom edge toward said top edge, said first post having a tip spaced away from said top edge, and
   a second post projecting vertically from said bottom edge toward said top edge, said second post having a tip spaced away from said top edge.

15. A birdhouse according to claim 14 wherein said first post and said second post are spaced apart such that a bird of the size of a starling cannot pass between them without opening at least one of its wings.

16. A birdhouse according to claim 14, further comprising;
   a first shelf disposed below said entrance opening outside said birdhouse, and
   a second shelf disposed below said entrance opening inside said birdhouse.

17. A birdhouse according to claim 14 wherein said tip of said first post is spaced away from said tip of said second post by a distance which is at least 3.25 cm (1.28 inches) but not more than 3.89 (1.53 inches).

18. A birdhouse according to claim 17 wherein;
   said tip of said first post is spaced away from said top edge by a distance which is substantially 1.59 cm (0.63 inches), and
   said tip of said second post is spaced away from said top edge by a distance which is substantially 1.59 cm (0.63 inches).

19. A birdhouse according to claim 17 wherein said entrance opening further comprises;
   a first side edge connecting said top edge and said bottom edge,
   a second side edge connecting said top edge and said bottom edge, and
   said first side edge being spaced away from said second edge by a distance of no more than substantially 10.31 cm (4.06 inches).

20. A birdhouse according to claim 17 wherein said entrance opening further comprises;
   a first side edge connecting said top edge and said bottom edge,
   a second side edge connecting said top edge and said bottom edge, and
   said first side edge being spaced away from said second edge by a distance of no more than substantially 9.68 cm (3.81 inches).

* * * * *